United States Patent Office 3,545,253
Patented Dec. 8, 1970

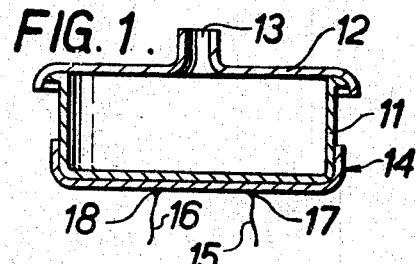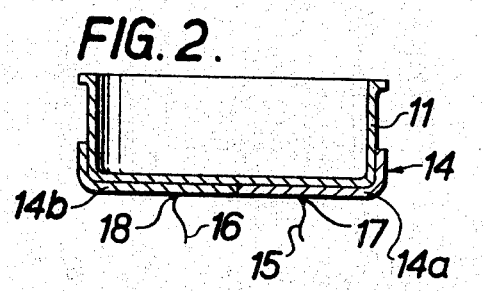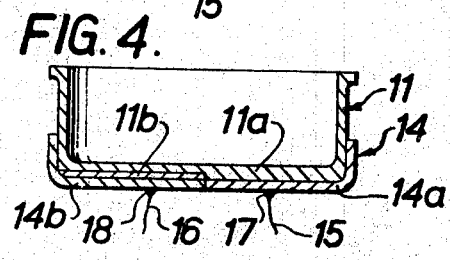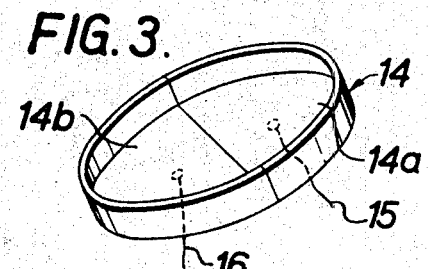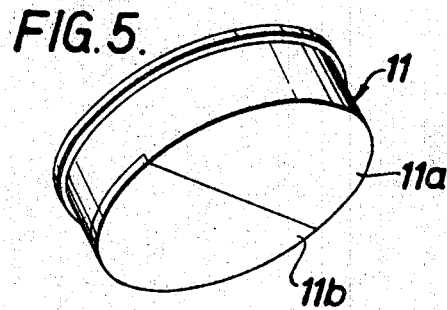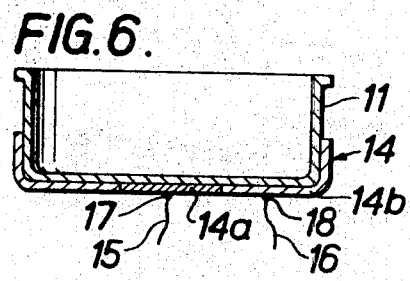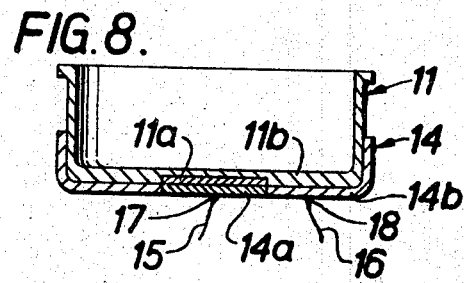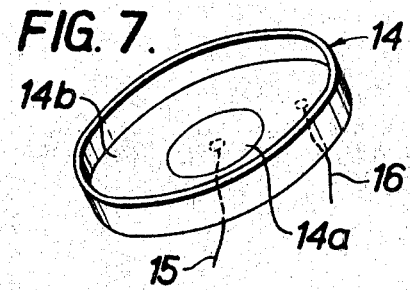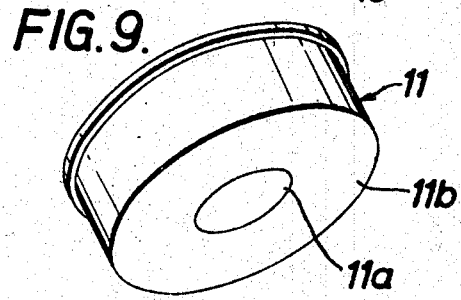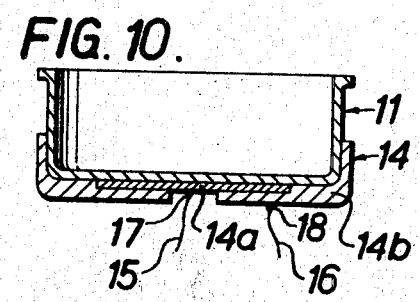

3,545,253
TEMPERATURE MEASURING DEVICES FOR THERMAL ANALYSIS
Shigeo Iwata and Harumi Morikawa, Kyoto, Japan, assignors to Chyo Balance Corporation, Kyoto, Japan, a corporation of Japan
Filed Mar. 23, 1967, Ser. No. 625,514
Claims priority, application Japan, Mar. 30, 1966, 41/29,403; Oct. 25, 1966, 41/99,210
Int. Cl. G01n 25/00
U.S. Cl. 73—15    3 Claims

ABSTRACT OF THE DISCLOSURE

An improved temperature measuring device for thermal analysis which utilizes the combination of a particular sample vessel with a particular saucer for receiving the sample vessel, the saucer being provided with a thermocouple hot junction.

---

This invention relates to temperature measuring devices for thermal analysis.

In various forms of thermal analysis such as thermal weighing, thermobalance, differential thermal analysis, thermal titration and thermal decomposition, the measurement of the temperature of samples is of utmost importance and is the central object. While the measurement of the temperatures of samples is carried out by using a thermocouple, there is inconvenience in that when the sample melts, the hot junction of the thermocouple cannot be contacted directly with the sample. In such cases, there is no choice but to bring the hot junction of the thermocouple into contact with the exterior of the sample vessel or container for taking measurements. In general, such sample vessel or container, however, is often exposed to a heat source for heating the sample, so that the hot junction will be subject to influences such as radiant heat from the heat source and it is thus impossible to avoid the disadvantage that the measured value fails to indicate the true temperature of the sample. Generally such sample vessels for thermal analysis are shaped in an elongated form. Use of such elongated sample vessels has a disadvantage in that there are produced significant differences in the temeprature and in the rate of reaction between the surface and the bottom of the sample in the vessel because the heat from the atmosphere influences the sample differently at those regions. Further, such elongated sample vessels have another disadvantage that the gas produced as a result of the reaction due to heating will diffuse in the sample and cannot easily escape.

The primary object of the invention is to provide a novel and improved device for measuring the temperature of a sample in thermal analysis, which is free from the aforesaid disadvantages.

Another object of the invention is to provide a new and improved device for measuring the temperature of a sample in thermal analysis through the utilization of a thermocouple which is readily responsive to the heat of the sample whereby accurate measurement can be performed.

A further object of the invention is to provide a sample temperature measuring device for use in thermal analysis which is capable of converting the transferred heat into an electromotive force with high sensitivity and a good efficiency.

The temperature measuring device for use in thermal analysis of samples according to the invention comprises the combination of a sample vessel and a saucer therefor. The sample vessel is shaped in the form of a flat bottomed dish and the saucer is in close contact with the bottom of the sample vessel to provide a support therefor. The feature that the sample vessel is in the form of a flat dish is advantageous in that since the sample is caused to spread in a thin layer therein the rate of reaction, composition and temperature of the sample can be maintained uniform throughout the whole depth of the sample and also in that in case of gases being produced from the lower region of the sample due to reaction, they can easily escape outside before diffusing in the upper region of the sample.

By the term "flat dish" as used herein is meant that in case of a cylindrical vessel at least the height is smaller than the diameter. A preferable range of the ratio of the height to the diameter would be 1.1 to 1:10. Further, while the volume of the sample vessel is usually about 0.3 cc. differential thermal analysis, it can be widely changed depending upon the object. However, barring certain exceptions, it will usually be within a range of 0.001 cc. to 100 cc. The diameter of the specimen vessel (in case of a cylindrical shape) corresponding thereto ranges usually from 0.1 mm. at minimum to 10 cm. at maximum.

According to the invention the saucer closely contacted with the bottom of the dis-shaped sample vessel has lead wires for a thermocouple welded thereto. Since the sample vessel and the saucer are in close planar contact with each other at the bottom of the sample vessel, the heat from the sample is quickly transferred from the bottom of the sample vessel to the saucer, the temperature of which is measured by the thermocouple welded to the saucer with quick response. That is, the heat from the sample is rapidly transferred to the thermocouple by conduction before it escapes to any other places by convection and radiation.

Also, according to the present invention, the thermocouple lead wires are welded to the saucer, not merely contacted therewith, to assure perfect electric contact. In addition, the saucer is made of a material which is the same as at least one of the thermocouple component materials, the entire saucer constituting a hot junction, so that the transfer of heat is made further dependable and rapid, thus it is possible to measure the temperature of the sample with considerable accuracy and improved response.

The other objects and advantages of the invention will become apparent from the following detailed description in conjunction with the accompanying drawings in which:

FIG. 1 is a longitudinal sectional view of a fundamental embodiment of the device according to the present invention;

FIG. 2 is a longitudinal sectional view showing another embodiment of the saucer associated with a sample vessel similar to that shown in FIG. 1;

FIG. 3 is a perspective view of the saucer of the device shown in FIG. 2;

FIG. 4 is a longitudinal sectional view showing a different embodiment of the sample vessel for a saucer similar to that shown in FIG. 1;

FIG. 5 is a bottom perspective view of the sample vessel shown in FIG. 4;

FIG. 6 is a longitudinal sectional view showing another embodiment of the saucer in combination with a sample vessel;

FIG. 7 is a perspective view of the saucer shown in FIG. 6;

FIG. 8 is a longitudinal sectional view of the combination of another specimen vessel and saucer;

FIG. 9 is a bottom perspective view of the sample vessel shown in FIG. 8; and

FIG. 10 is a longitudinal sectional view of a combination of still another specimen vessel and saucer.

Referring to the drawings, like reference characters indicate like parts throughout the figures.

FIG. 1 shows a fundamental embodiment of the temperature measuring device for thermal analysis of samples which comprises a sample vessel and a saucer having a thermocouple hot junction. In FIG. 1, the numeral 11 designates a sample vessel and 12 a lid therefor having a vent hole 13 at the center. The numeral 14 indicates a saucer for the sample vessel 11. The sample vessel is made in the form of a flat cylinder. However, it need not be cylindrical provided that it is a flat dish shape. The sample vessel 11 and the lid 12 are made of such materials as will not react with the sample and will not cause any change of mass due to heat. Examples of suitable materials are platinum, nickel, various alloys, quartz, etc. The saucer 14 is so shaped as to cover the entire bottom wall and the peripheral lower region of the sample vessel 11 and is in close planar contact with the bottom wall of the sample vessel at those areas. Though not shown, support legs, support arms or other suitable support means are attached to the saucer 14.

Furthermore, according to the invention, the saucer 14 is made of one of the thermocouple constituting materials. For example, in the case of a thermocouple with platinum and platinum-rhodium combined in couple, the saucer 14 is made of platinum or platinum-rhodium. However, if the combination of other different materials is employed for the thermocouple, the saucer is made of a material corresponding to either one thereof. Examples of combinations of metals usable for the thermocouple are, in addition to said platinum and platinum-rhodium, Chromel and Alumel (R.T.M.), copper and constantan, tungsten and rhenium, carbon and tungsten, etc. The saucer 14 and sample vessel 11 may be made of the same material, e.g. platinum.

The saucer 14 has lead wires for the thermocouple welded thereto. In the drawing, the numeral 15 designates the first lead wire of one material and 16 the second lead wire of the other material, 17 and 18 designating welds for the respective lead wires to the saucer 14. The welds 17 and 18 may be located at any selected positions on the bottom wall of the saucer 14. One of the lead wires 15 and 16 is of the same material as that of the saucer 14. For example, when the saucer 14 is made of platinum, the lead wire 15 is a platinum wire and the other lead wire 16 is a platinum-rhodium wire.

The thickness of the sample vessel 11 and saucer 14 is relatively thin, preferably it being between 0.1 mm. to 1.0 mm.

The thermocouple lead wires 15 and 16 are connected to a galvanometer, which is not shown.

FIG. 2 shows another embodiment showing another combination of a sample vessel and a saucer. While the sample vessel 11 shown therein is similar to that shown in FIG. 1, one half of the saucer 14 is made of one thermocouple constituting material and the other half is made of the other thermocouple constituting material. FIG. 3 is a perspective view of the saucer shown in FIG. 2. The saucer 14 has its one semicircular portion 14a made of, e.g., platinum and the other semicircular portion 14b made of e.g., platinum-rhodium, the two semicircular portions constituting a complete saucer 14. The thermocouple lead wires 15 and 16 are connected to the respective portions of the bottom of the saucer 14 having the same materials. Thus, in the aforesaid case, the lead wire 15 is platinum and the lead wire 16 is a platinum-rhodium. It is of course possible to utilize a metal pair which is a combination of the saucer material and thermocouple lead wires.

In an embodiment shown in FIGS. 2 and 3, the saucer literally constitutes a thermocouple, so that it is more readily responsive than that shown in FIG. 1.

FIG. 4 shows a further modification of the combination of a sample vessel and a saucer. While the saucer 14 is the same as that shown in FIGS. 2 and 3, the difference is that the sample vessel 11 has its one part made of one of the thermocouple constituting materials and the remainder is made of the other material. In this embodiment, as better illustrated in FIG. 5, the sample vessel 11 has its main body 11a made of one of the materials constituting the thermocouple, e.g., platinum, and a thin plate 11b made of the other of the thermocouple constituting materials, e.g., platinum-rhodium which is welded to the region having just half the area of the half circle on the back face of the bottom. As corresponding thereto, the saucer 14 has its one half 14a made of platinum and the other half 14b made of platinum-rhodium. The numeral 15 designates a platinum lead wire; 16 a platinum-rhodium lead wire; 17 a weld for the platinum lead wire 15; and 18 a weld for the platinum-rhodium lead wire.

In the embodiment shown in FIG. 4, the placement of the sample vessel 11 on the saucer is such that the same material portions contact with each other. That is, the portion 11a made of platinum on the bottom of the sample vessel 11 contacts the portion 14a of the saucer 14 made of platinum, while the platinum-rhodium portion 11b welded to the bottom of the sample vessel 11 contacts the platinum-rhodium portion 14b of the saucer 14.

A particular feature of the embodiment shown in FIGS. 4 and 5 is that the sample vessel 11 itself is formed with the hot junction of the thermocouple. Since the hot junction constituting material portions 11a and 11b of the sample vessel 11 are connected to the lead wires 15 and 16 of the same materials through the same material portions of the saucer 14. The portion 11a of the sample vessel 11 can, essentially, be regarded as integral with the lead wire 15 and the portion 14a of the saucer 14, and likewise the portion 11b of the sample vessel 11 as integral with the lead wire 16 and the portion 14b of the saucer 14. Thus a thermocouple temperature measuring device with better response is obtained. Further, as the hot junction is in planar contact with the sample vessel, quick response can be expected since the heat produced is immediately converted into an electromotive force.

While in the embodiment shown in FIGS. 2 and 3 the saucer 14 is constituted by thermocouple constituting materials in the form of semicircular portions each forming a complement to the other, it is also possible as shown in FIGS. 6 and 7 that the thermocouple constituting material portions complementary to each other are arranged in concentric circles. That is, in FIGS. 6 and 7, the central portion 14a of the saucer 14 is made of platinum and the outer peripheral portion 14b of the saucer 14 is made of platinum-rhodium. The numerals 15 and 16 designate platinum and platinum-rhodium lead wires, respectively; and 17 and 18 welds therefor. The sample vessel 11 is the same as that shown in FIG. 1 or 2.

FIG. 8 shows another modification of the embodiment shown in FIG. 6, wherein the saucer 11 is similar to that shown in FIGS. 6 and 7, but the sample vessel 11 is of a different design. That is, the central portion 14a and outer peripheral portion 11b of the saucer 14 are made of mutually complementary thermocouple constituting materials, e.g., platinum and platinum-rhodium, and the lead wires 15 and 16 of the same materials respectively are welded at welds 17 and 18. On the other hand, those portions of the sample vessel 11 which are respectively in contact with the central portion 14a and the outer peripheral portion 14b of the saucer 14 are respectively made of the same materials. To this end, the main vessel body 11b is made of platinum-rhodium and the central platinum-rhodium portion of the back surface of the bottom wall of the sample vessel 11 is cut away to form a recess, in which a thin platinum plate 11a is welded. Therefore, the central thin platinum plate 11a of the sample vessel 11 has the same size of area as the central platinum portion 14a of the saucer 14. The sample vessel 11 shown in FIG. 8 is more clearly shown in FIG. 9 in a perspective view.

An advantageous feature of the embodiment shown in FIGS. 8 and 9 is that even if the sample vessel 11 is rotated relative to the saucer 14, the corresponding portions 11a and 14a of the same material of the sample vessel 11 and saucer 14 can be maintained in contact with each other and also the portions 11b and 14b in contact with each other, irrespective of any rotary portion of the sample vessel 11 and saucer 14, so that there is no need for paying attention to the setting of the relative position of the sample vessel 11 and saucer 14.

In the embodiment shown in FIG. 6 when it is desired to establish plane contact for the saucer 14, this may be achieved in the manner shown in FIG. 10. That is, while, in FIG. 10, the design in which the portion 14a of the saucer 14 contacting the central portion of the bottom wall of the sample vessel 11 and the portion 14b of the saucer 14 contacting the outer peripheral portion of the bottom of the sample vessel 11 are respectively made of mutually complementary thermocouple materials, e.g., platinum and platinum-rhodium, is the same as the design of the device shown in FIG. 6, the portions 14a and 14b are in planar contact with each other over a substantial area. The portions 14a and 14b have lead wires 15 and 16 respectively welded thereto as in the example shown in FIG. 6.

It will be readily understood that a sample vessel like one shown in FIG. 8 may be used with the saucer 14 shown in FIG. 10.

What we claim is:

1. In a temperature measuring device for thermal analysis of samples having a flat-bottomed dish shaped sample vessel for accommodating the sample, a saucer for mounting the sample vessel which saucer constitutes a thermocouple junction and is configured interiorly to conform to the outer surface of the sample vessel and first and second thermocouple lead wires attached to the saucer; the improvement comprising a first portion of the bottom wall of said saucer made of one thermoelectric material, a second portion constituting the remaining portion of said saucer bottom made of a material thermoelectrically complementary to the material of the first portion of the saucer, and wherein the first thermocouple lead wire is made of the same material as the first portion of the saucer bottom and connects to the first portion of the saucer bottom, the second thermocouple lead wire is made of the same material as the second portion of the saucer bottom and is connected to the second portion of the saucer bottom, the sample vessel is comprised of a first portion made of the same material as the first portion of the saucer bottom, a second portion made of the same material as the second portion of the saucer bottom and whereby the sample vessel is adapted to fit within the saucer such that the first portion of the sample vessel and the first portion of the saucer bottom are in intimate contact and the second portion of the sample vessel and the second portion of the saucer bottom are in intimate contact.

2. A temperature measuring device for thermal analysis of samples as in claim 1 wherein the first portion of the vessel bottom is centrally disposed and circularly shaped, the second portion of the vessel bottom is circularly shaped and arranged concentrically around the centrally disposed first portion, the first portion of the saucer is centrally disposed, circularly shaped and of the same size as the first portion of the vessel bottom and the second portion of the saucer is circularly shaped, concentrically arranged around the first portion of the saucer bottom and of the same size as the second portion of the sample vessel bottom.

3. A temperature measuring device for thermal analysis of samples as in claim 1 wherein the sample vessel and saucer bottom are circularly configured, the first portion of the vessel bottom is semi-circularly shaped, the second portion of the vessel bottom is adjacent to the first portion thereof and semi-circularly shaped, the first portion of the saucer bottom is semi-circularly shaped and of the same size as the first portion of the vessel bottom and the second portion of the saucer is adjacent to the first portion thereof and semicircularly shaped, and of the same size as the second portion of the sample vessel bottom.

References Cited
UNITED STATES PATENTS

| | | | |
|---|---|---|---|
| 2,997,513 | 8/1961 | Rall et al. | 73—359 |
| 3,007,988 | 11/1961 | Jaffe et al. | 73—359 |
| 3,285,053 | 11/1966 | Mazieres | 73—15 |
| 3,298,220 | 1/1967 | Stone et al. | 73—15 |

RICHARD C. QUEISSER, Primary Examiner

J. K. LUNSFORD, Assistant Examiner